(12) United States Patent
Heneveld (10) Patent No.: US 7,032,941 B2
(45) Date of Patent: Apr. 25, 2006

(54) TOOL INCLUDING ADJUSTABLE HANDLE

(76) Inventor: William R. Heneveld, 7484 Candlewood Dr., SE., Grand Rapids, MI (US) 49546

( * ) Notice: Subject to any disclaimer, the term of this patent is extended or adjusted under 35 U.S.C. 154(b) by 258 days.

(21) Appl. No.: 10/635,104

(22) Filed: Aug. 6, 2003

(65) Prior Publication Data
US 2005/0029825 A1    Feb. 10, 2005

(51) Int. Cl.
*A01B 1/22* (2006.01)
(52) U.S. Cl. ........................................ 294/51; 294/53.5
(58) Field of Classification Search ................ 294/49, 294/51, 52, 53.5, 55, 57; 7/114–116; 16/422, 16/430; 403/93, 101, 103
See application file for complete search history.

(56) References Cited

U.S. PATENT DOCUMENTS

| | | | | |
|---|---|---|---|---|
| 261,894 A | * | 8/1882 | Albers | 294/53.5 |
| 320,136 A | * | 6/1885 | Iwan et al. | 172/372 |
| 453,776 A | * | 6/1891 | McCory | 294/52 |
| 881,782 A | * | 3/1908 | Elliott | 294/51 |
| 987,918 A | * | 3/1911 | Schmid et al. | 294/51 |
| 1,245,024 A | * | 10/1917 | Pugliese | 294/52 |
| 1,427,865 A | * | 9/1922 | Szabo | 294/53.5 |
| 1,500,132 A | * | 7/1924 | Hummelgard | 294/51 |
| 2,689,155 A | * | 9/1954 | McIntosh | 294/51 |
| 3,115,359 A | * | 12/1963 | Hendrick | 294/53.5 |
| 4,097,945 A | | 7/1978 | Scott | |
| D251,823 S | | 5/1979 | Prince | |
| 4,476,939 A | | 10/1984 | Wallace | |
| 4,716,653 A | | 1/1988 | Skyba | |
| 4,947,553 A | | 8/1990 | Bendickson et al. | |
| 5,103,520 A | | 4/1992 | Mazzo | |
| 5,265,969 A | * | 11/1993 | Chuang | 403/94 |
| 5,367,774 A | | 11/1994 | Labarre et al. | |
| 5,425,153 A | * | 6/1995 | Vosbikian | 15/257.2 |
| 5,511,310 A | | 4/1996 | Sessions et al. | |
| 5,628,370 A | | 5/1997 | Chrysler | |

(Continued)

OTHER PUBLICATIONS

Exhibit A, Includes photographs and hand drawings of a 10-inch pruning saw made by Fiskars, Inc., Sauk City, WI 53583, including a handle, a saw blade pivoted to the handle, and a depressible button for releasing the saw blade and latching the saw blade in open and closed positions, no date.

(Continued)

*Primary Examiner*—Dean J. Kramer
(74) *Attorney, Agent, or Firm*—Price, Heneveld, Cooper, DeWitt & Litton LLP (57) ABSTRACT

A tool includes different tool heads, and an angularly adjustable handle. The angular adjustability allows better ergonomic body posture during use, thus reducing stress and injury, and also allows multiple functions for each tool. The handle comfortably receives a user's hand, with the user's thumb or forefinger located at a release button. The release button is spring-biased and includes teeth that inter-engage with teeth on the tool head to latchingly hold a selected angular position. A resilient cover encases the handle and the release button, preventing dirt from entering the button area to prevent jamming. The covering slips onto the handle and includes an annular lip that stretches over an end surface to retain the covering on the handle. The cultivator includes tines that, by adjusting an angle of the handle, extend in a direction parallel the handle but offset therefrom, or that extend at an angle to the handle.

31 Claims, 9 Drawing Sheets

U.S. PATENT DOCUMENTS

| | | | |
|---|---|---|---|
| 5,697,159 A | | 12/1997 | Linden |
| 5,716,087 A | | 2/1998 | Backich et al. |
| 5,848,473 A | | 12/1998 | Brandenburg, Jr. |
| 5,975,601 A | * | 11/1999 | Spear et al. .................. 294/49 |
| 6,131,971 A | * | 10/2000 | Chen ........................... 294/51 |
| 6,155,620 A | * | 12/2000 | Armstrong ................... 294/57 |
| 6,315,341 B1 | * | 11/2001 | Leon et al. ................ 294/53.5 |
| 6,364,562 B1 | * | 4/2002 | Tung ........................... 403/93 |

OTHER PUBLICATIONS

Exhibit B, Includes photographs and hand drawings of a 6-inch pruning saw made by Fiskars, Inc., Sauk City, WI 53583, including a handle, a saw blade pivoted to the handle, and a depressible button for releasing the saw blade and latching the saw blade in open and closed positions, no date.

* cited by examiner

TOOL INCLUDING ADJUSTABLE HANDLE

BACKGROUND

The present invention relates to tools, and in particular relates to a tool having an adjustable handle adapted for positioning in different orientations for comfort, function, and preference. The illustrated tools are hand tools such as for gardening and yard work, but the present inventive concepts are not believed to be limited to only such uses and tools.

Serious gardeners, landscapers, and outdoor yard workers want hand tools that are comfortable. They also want tools that are adjustable for individual preferences and for multiple functions, and further that are ergonomically designed to minimize stress and injury to arms, wrists, and hands. Many hand tools are not designed this way. For example, many trowels and transpianters for planting and maintaining plants are designed so that the blade aligns with the handle. As a result, the worker must awkwardly bend his/her wrist and raise his/her elbow and upper arm when driving the blade into the ground. This causes the user's awkwardly-bent wrist and arm to position his/her bones, muscles, and tendons in a non-aligned and unnatural position, where the stress from digging is unbalanced, poorly directed, and unhealthy. As a result, this can cause arthritis and soreness in the arm, wrist, and hand, particularly where the gardener is not a young person or is not used to substantial physical labor. According to The American College of Rheumatology, "The most common cause of tendonitis and bursitis includes injury . . . due to bad posture, or uses of the affected limb in an awkward position." Compounding this problem is the fact that many handles are not ergonomically designed for grasping, but instead are designed using traditional cylinder shapes and sizes that are not easily grasped, are not optimally suited to assist in holding onto the tool when driving the head into the ground or when wet, and are not designed for optimal ergonomic use.

Though optimal alignment and positioning of the wrist is important, the optimal handle position on a hand tool may vary for different users and/or for different jobs. However, it is not economical for the retailer to carry multiple versions of the same tool, nor for the homeowner to purchase a different tool for each job. Hence, it is desirable to provide a tool that can be adjusted to an optimal position to meet different user preferences, different user needs, and different jobs.

Though adjustability is important, so is the ease of adjustment. Any adjustment should preferably be easily made, so that the user does not have to struggle to accomplish it. Further, the adjustment preferably should not require separate parts and pieces, since the parts and pieces can get lost. Also, the adjustment should be able to be done without the need for other tools, and should not take much time, since the worker wants to get at his/her task, and not spend considerable "getting ready to get started" time. Another problem with hand tools, particularly those used in gardening and yard work, is that the tools quickly become dirty and corroded, with dirt and debris being packed into crevices and clearances needed for allowing the adjustment.

The tool industry is highly competitive, and accordingly, any tool design must be cost-competitive to manufacture and assemble, durable and long-lasting in use, and ergonomically designed for optimal user comfort.

Accordingly, a hand tool is desired solving the aforementioned problems, and having the aforementioned advantages.

SUMMARY OF THE PRESENT INVENTION

One aspect of the present invention includes an adjustable tool comprising a tool head configured for doing at least one particular task, a handle, and an internally-positioned adjustment mechanism adjustably connecting the tool head to the handle. The adjustment mechanism is configured to support selective angular adjustment of the tool head relative to the handle between at least two different use positions and to hold the tool head in a selected one of said two different use positions.

Another aspect of the present invention includes a garden hand tool comprising an elongated handle adapted to receive a person's hand. A tool head extends substantially in-line with the handle and is connected to the handle. The tool head has an active surface shaped for effective use and also has a back surface. The handle defines a direction extending at an angle of at least about 15° away from the active surface toward the back surface to promote an ergonomic wrist position when using the tool.

Another aspect of the present invention includes an adjustable tool comprising a tool head. A handle is adjustably connected to the tool head, the handle including a recess adapted to ergonomically receive and support a user's thumb and fingers so that pressure can be readily communicated through the handle to the tool head while using the tool. A release button is movable between a released position and a latched position for fixing the tool head to the handle in a selected adjusted position. The release button is located near the recess where the release button is easily operated by the user to adjust the tool head.

Another aspect of the present invention includes an adjustable tool comprising a tool head, and a handle adjustably connected to the tool head. The tool head is adjustable, at least, between a first position where the tool head extends generally parallel to the handle but is offset laterally from being directly in line with the handle, and a second position where the tool head extends at an angle to the handle but is supported generally in line with the handle whereby when the tool head is in the first position is usable in a forward motion to dig into and lift, and when in the second position is usable in a pulling motion to scratch and claw.

It is an object of the present invention to provide a tool that is easily and readily adjustable, so that the tool's working end can be used for many different functions. For example, a tine can be arranged parallel a handle for use as a fork, or can be arranged at an angle to be useful by dragging as a cultivator. Also, for example, a trowel can be arranged parallel a handle for use as a shovel-like digger, or can be arranged at an angle for use as a V-hoe. Also, for example, a transplanter blade can be arranged parallel a handle for transplanting, or arranged at an angle for bulb planting. In each of these different uses, the handle can be positioned at an ergonomic angle to reduce stress on a user's wrist and forearm.

These and other aspects, objects, and features of the present invention will be understood and appreciated by those skilled in the art upon studying the following specification, claims, and appended drawings.

DETAILED DESCRIPTION OF PREFERRED EMBODIMENTS

A hand tool 30 (FIG. 1) includes a trowel/V-hoe tool head 31, and an angularly adjustable handle 32. The handle 32 comfortably receives a user's hand, with the user's thumb or forefinger located at an adjustment mechanism comprising a release button 33 with teeth thereon. The release button 33 is biased with a spring 34 (FIG. 2) and includes teeth 35 that inter-engage with teeth 36 on the tool head 31 to provide a positive latching mechanism to hold a selected angular position. A water-impermeable resilient cover 37 covers the handle internal structure 38 and the release button 33 in a glove-like manner, preventing dirt from entering the button area to prevent jamming of the latching mechanism. Different tool heads can be provided, such as the illustrated transplanter/bulb planter tool head 31A and the cultivator/garden fork tool head 31B, to make a reconfigurable tool kit.

The trowel/V-hoe tool head 31 (FIGS. 3–6) is preferably made of aluminum or similar durable material suitable for the intended use. The trowel/V-hoe tool head 31 includes a working end 40 that is generally elongated, triangularly-shaped, and relatively flat, but with a transverse cross section that is slightly dished. The working end 40 has curvilinear edges 41 forming a point 42. Further, indicia such as depth markings 43 are formed into the working end to facilitate its accurate use. The "front surface" (i.e. the surface having the depth markings 43) is referred to as the "active surface" herein, because it is the surface most actively used to carry dirt and material. Also, it is readily visible to a user, such as a gardener, while he/she is doing yard and outdoor work. The relation of the plane of the active surface to the handle is very important. When this angle is about 30°, it aligns the bones in a user's forearm 90 so as to minimize and reduce stress on the user's wrist 91, when digging while working on one's hands and knees for doing yard work. Surprisingly and unexpectedly, I have not found garden tools with this angle as defined. Angles other than 30° may be beneficial for some yard work/tasks, but 30° appears to work best for digging,"jabbing", and similar work.

The handle-connected end 44 includes a stem 45 and a disk-shaped flange 46 with flat sides that extend parallel the stem 45, and that define a thickness. The disk-shaped flange 46 has a thickness and includes an arcuate edge flange 47 that comprises about 20%–25% of its thickness, a row of teeth 36 that form about 50%–60% of the thickness along an outer edge on one side of the flange 46, and an arcuate channel 48 forming about 20%–25% of the thickness along an outer edge of the other side of the disk-shaped flange 46 opposite the teeth 36. The illustrated teeth 36 have an angled outer corner surface 49 so that the mating teeth 35 on the release button 33 do not have to move transversely as great of a distance in order to disengage the teeth 36. The illustrated teeth 36 are seven in number, although more or less can be used. In the illustrated teeth 36, one is located approximately at a center line of the tool head 31, two teeth 36 are located above the center tooth and four teeth are formed below the center tooth. However, it is contemplated that more or less teeth can be constructed, and further, that different shapes of teeth can be utilized.

Figure 2:
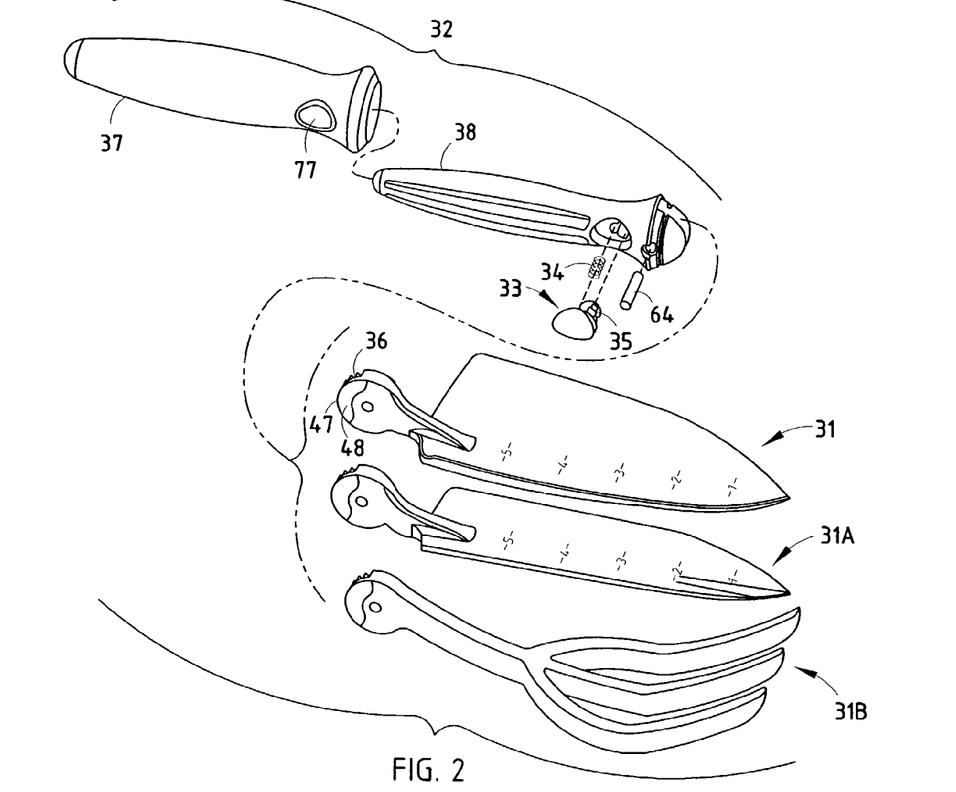
FIG. 2 is an exploded view of a kit including the handle of the tool of FIG. 1, and including three tool heads (including the tool head shown in FIG. 1)
Figure 3:
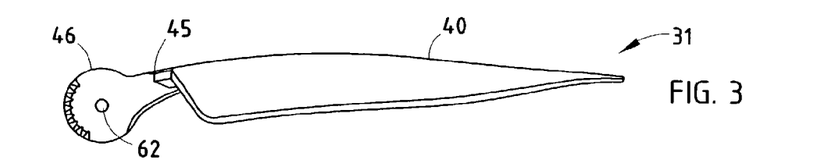
FIGS. 3–4 are side and plan views of the tool head shown in FIG. 1.
Figure 4:
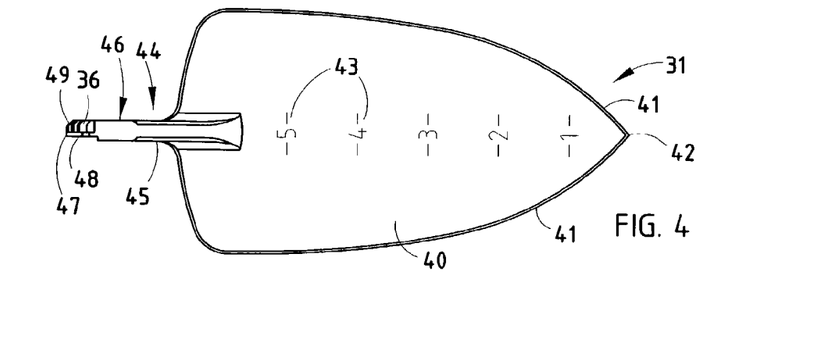
Figures 5, 6, 7:
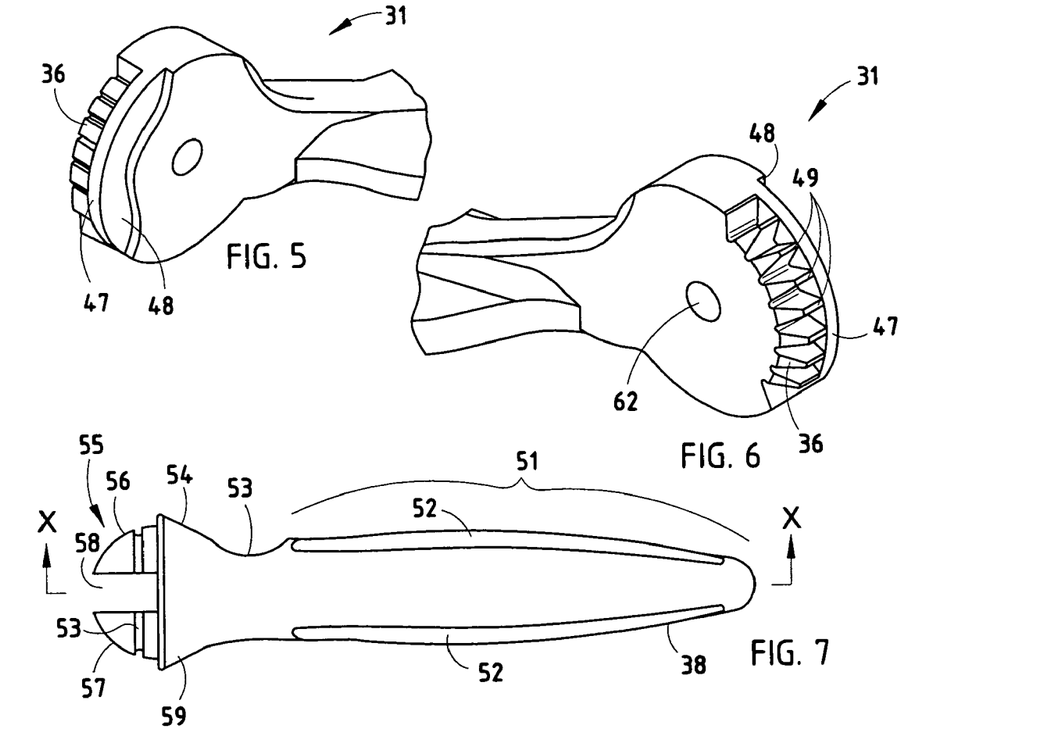
FIGS. 5–6 are fragmentary perspective views of the handle-connecting end of the tool head of FIG. 3.
FIGS. 7–9 are top, side, and end views of the handle internal structure of FIG. 1.
Figure 8:
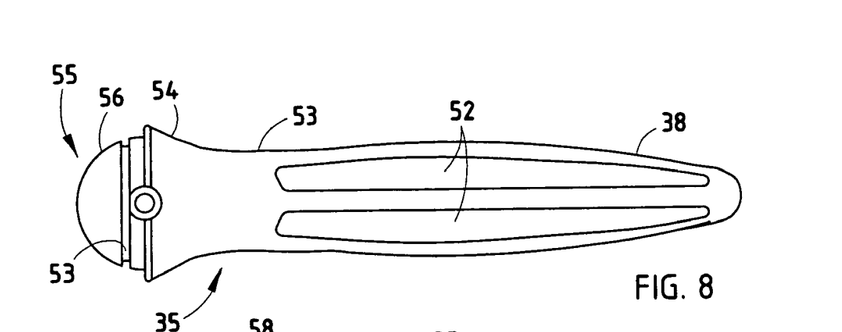
Figure 9:
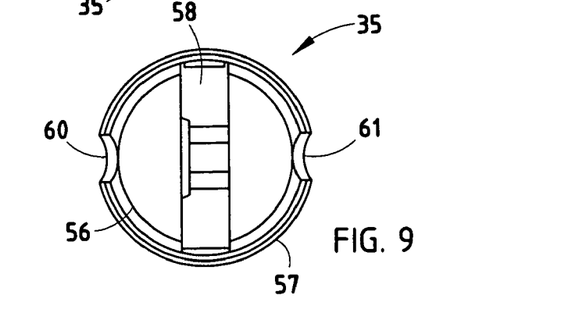
Figure 10:
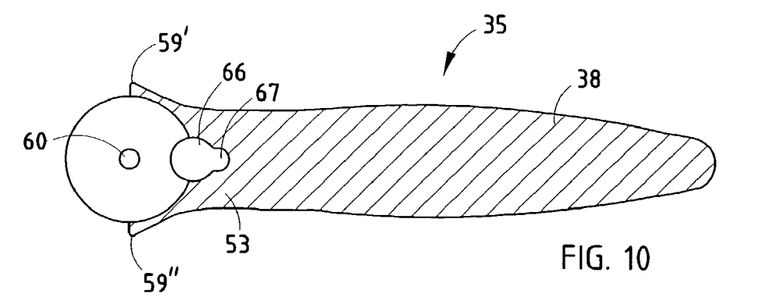
FIG. 10 is a cross section taken along the line X—X in FIG. 7.
Figure 11:
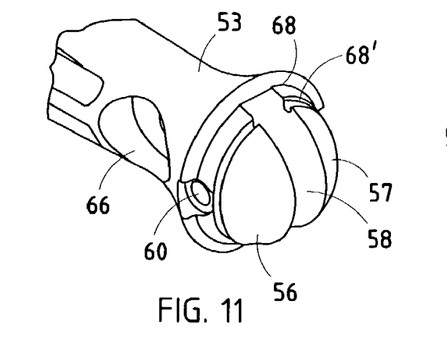
FIGS. 11 and 11A are left and right perspective views of the tool-connecting end of the handle structure of FIG. 7.
Figure 11A:
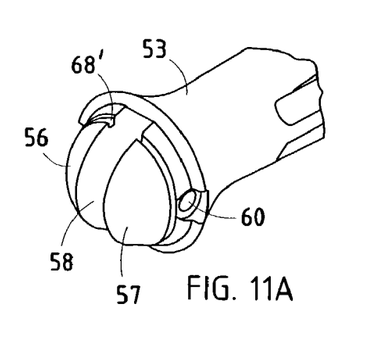

The handle internal structure 38 (FIGS. 7–10) includes a frame portion 51 with channels 52 formed therein to reduce a mass of the frame portion 51. Further, the channels 52 facilitate cooling and die-casting by eliminating large, thick sections of material. The handle portion 51 is designed for optimal ergonomics and includes a reduced section or circumferential recess 53 at its tool-engaging end for comfortably receiving a person's thumb and first finger. Further, an enlarged section 54 is located at the tool-receiving end and includes an outwardly-extending surface leading to a ball-shaped end 55 of the handle internal structure 38. The ball-shaped end 55 includes a pair of space-apart flanges 56 and 57 defining a cavity 58 therebetween with the lip 59 extending around opposing ends of the cavity 58. The cavity 58 is shaped to receive the disk-shaped flange 46 and includes holes 60 and 61 in flanges 56 and 57 that align with a hole 62 in the flange 46 for receiving a pivot pin 64 (FIG. 2). When the tool head 31 is assembled to the handle internal structure 38 by the pivot pin 64, the lip sections 59' and 59" (FIG. 10) limit the angular adjustment of the handle on the tool head 31. A hole 66 is formed at the base of the flange 56 and extends transversely for receiving the release button 33. A second hole 67 is formed overlapping with the hole 66 for receiving the spring 34 (FIG. 2) (see FIG. 10). One or more recesses or channels 68 and/or 68' are formed around the flanges 56 and 57 outboard of the holes 60 and 61 for providing a lip along with the end surfaces on the flanges 56 and 57 for more securely receiving the cover material of the cover 37 as described below.

Figure 12:
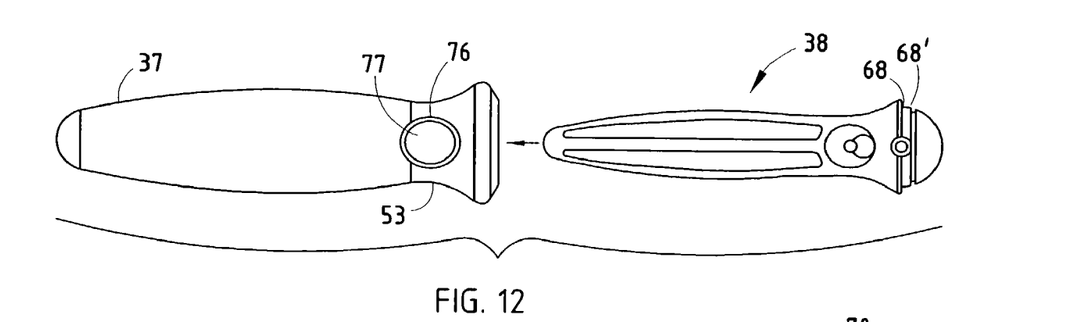
FIG. 12 is an exploded view of the handle, showing the handle internal structure of FIG. 7 and also the sock-like resilient handle covering.
Figure 13:
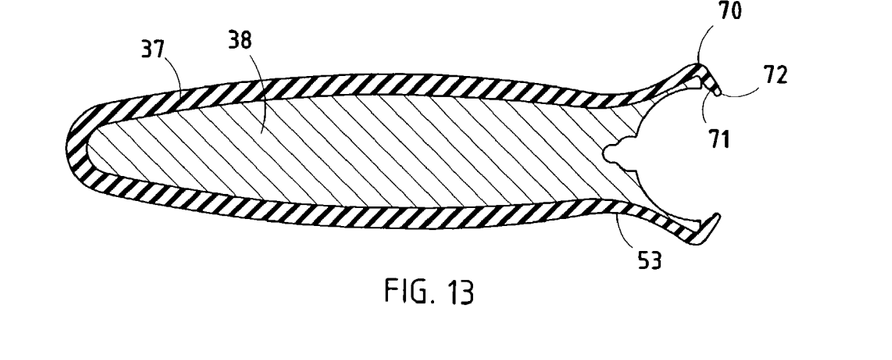
FIGS. 13–14 are longitudinal and transverse cross sections taken through an assembly of the handle components of FIG. 12, FIG. 14 being taken about midway along the handle.
Figures 14, 15, 16:
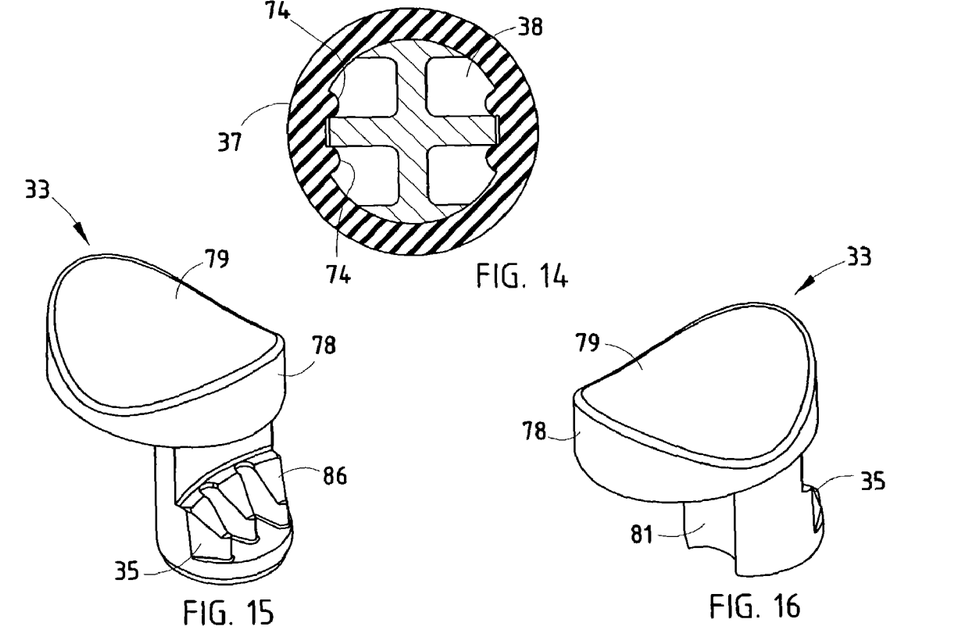
FIGS. 15–19 are right perspective, left perspective, end, side, and top views of the release button shown in FIG. 2.
Figure 17:
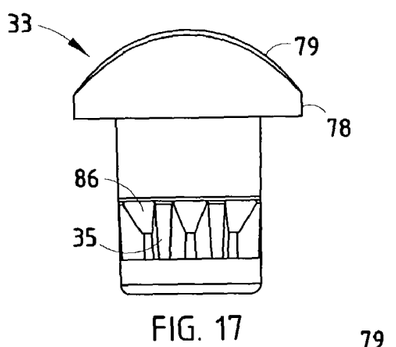

The cover 37 (FIG. 12) is a thick-textured flexible cover (such as vinyl or PVC) having a varied thickness of about 0.03 inches to 0.180 inches wall thickness. (It is noted that the cover is generally thinner around its button area.) The cover 37 is flexible and configured to slip onto the handle's internal structure 38 with a glove-like or sock-like motion. The cover 37 (FIG. 13) includes an annular lip 70 with a tip 71 shaped to fit into the channel 68 and further includes a flexible tip 72 shaped to flex and be stretched tight against the outer surfaces of flanges 56 and 57 (FIG. 12) and into channel 68' for good sealing to prevent dirt, debris, and moisture from entering the adjustment structure area. The cover 37 includes ribs 74 (FIG. 14) that engage the handle internal structure 38, such as in recesses 52 to orient the handle cover 37 in a particular rotational position. The handle cover 37 includes lines (formed by a recession or a protruding ridge) 76 (FIG. 12) that correspond to the button 33. However, the handle cover 37 is continuous and there is no break in the material around the button cover area 77.

Figure 18:
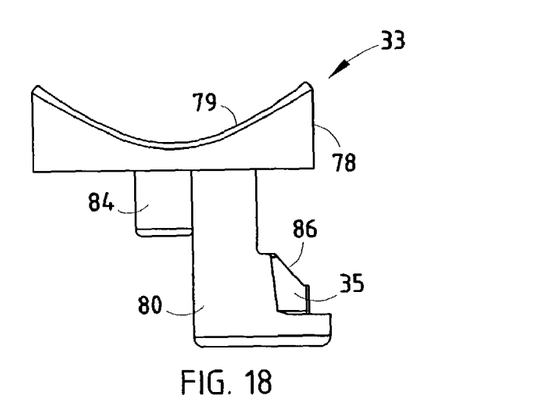
Figure 19:
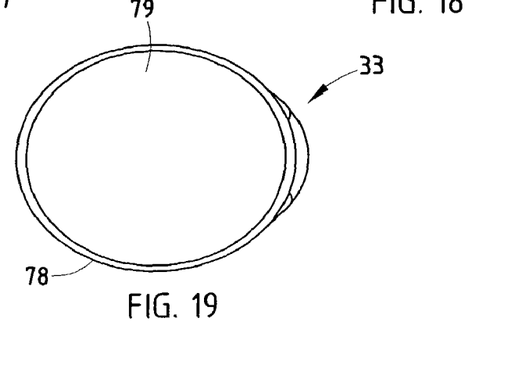

The release button 33 (FIGS. 15–19) (sometimes called a "latch member" herein) includes a button head 78 with a top surface 79 that generally matches the recess 53 formed around the tool-engaging end of the handle internal structure 38. However, it is noted that the outer surface of button 33 does not have a circumferential radius, but instead is linear when viewed from a side as shown in FIG. 18. This provides a little relief above the button 33 relative to a user's hand, which helps prevent inadvertent pressure on the button 33, which could cause inadvertent release of teeth 35 from teeth 36. The release button 33 further includes a shaft 80 shaped to fit mateably within the hole 66. A side of the shaft 80 (FIG. 16) includes a channel 81 shaped to receive the spring 34, with the spring 34 being positioned in the hole 67 at the same time as the release button 33 is positioned in the hole 66. A step 84 (FIG. 18) limits a depth that the release button 33 can be depressed by engagement of the step 84 and compressed spring 34 with a bottom of the hole 66 in the handle internal structure 38. As shown in FIG. 18, the release button 33 includes teeth 35 with an angled surface 86 formed by a cutaway corner. The angled surface 86 corresponds with the angled surface 49 on the teeth 36 to reduce a distance that the release button 33 must be moved to release the teeth 35 from the teeth 36. Three teeth 35 are shown on the release button 33, however, more or less teeth can be used. Further, it is contemplated that other engagement and latching mechanisms can be used such as undulating or roughened surfaces, saw-teeth-type arrangements, pin-to-hole arrangements, and the like.

The location of the button 33 is believed to be novel and patentable-both in its forward location in the handle 32, and in its location in recess 53 (which is where a user is grasping while using the tool). I spent significant time trying to design away from this location and position, until I realized the advantages and usefulness at this location . . . and realized that it did not have to result in inadvertent and/or accidental release of the latching adjustment mechanism.

To assemble the present construction, the release button 33 and spring 34 are arranged within the handle internal structure 38 and depressed sufficiently enough to allow the tool head 31 to be positioned. Thereafter, the pivot pin 64 is engaged in the holes 60, 62, and 61. If desired, the pivot pin can be frictionally, permanently press-fit into position. Alternatively, it is contemplated that the pin 64 can be made removable such as by providing a threaded end and screw-driver-receiving head. Thereafter, the cover 37 is pulled onto the handle internal structure 38, with the lip 70/71/72 being pulled into position on the enlarged section 54/56/57. This assembly allows manufactures an optimal sequence where one handle can be assembled to any one of several different tool heads, thus reducing inventory.

Figure 1:
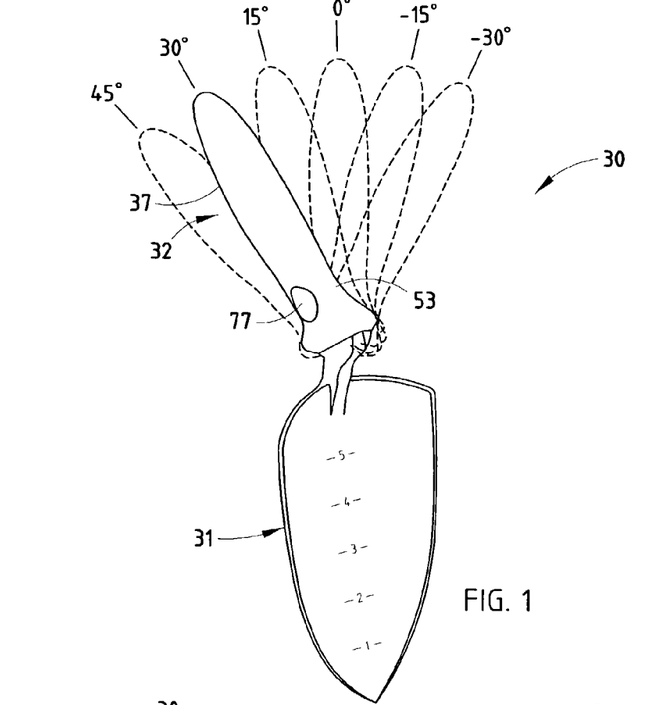
FIGS. 1–1B are perspective, plan, and side views of a hand tool embodying the present invention, FIG. 1 showing the handle adjusted to an approximate 30° angled position (solid lines), and showing various adjusted positions of the handle (in dashed lines)
Figure 1A:
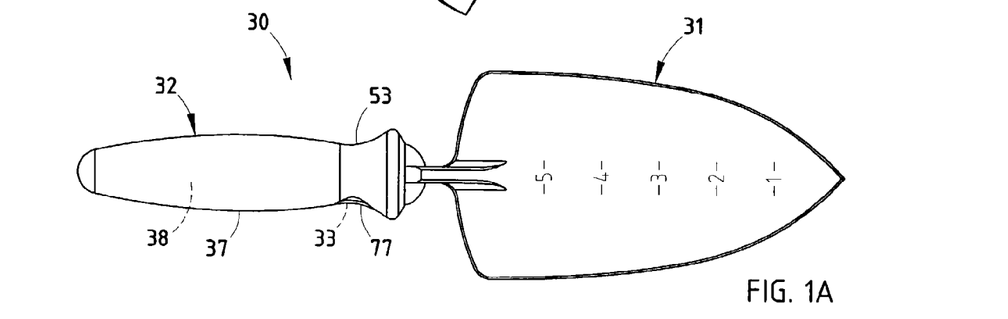
Figure 1B:
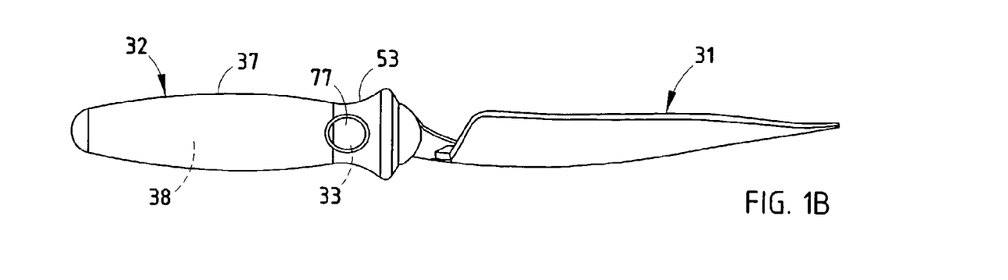
Figure 20:
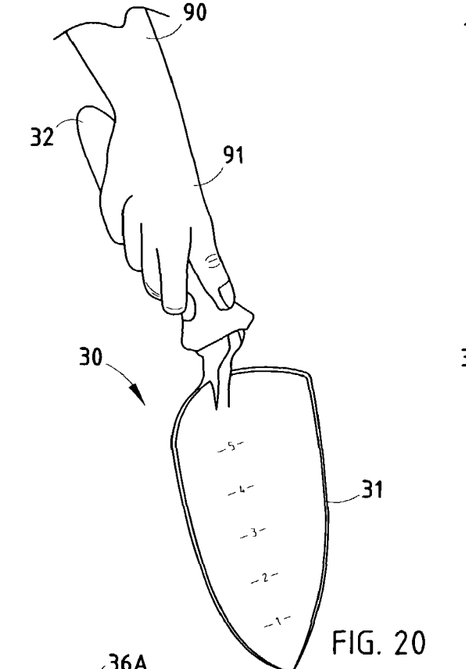
FIGS. 20–21 are perspective views showing an ergonomic best use (FIG. 20) and an ergonomically "less-preferable" use (FIG. 21) of the present tool.
Figure 21:
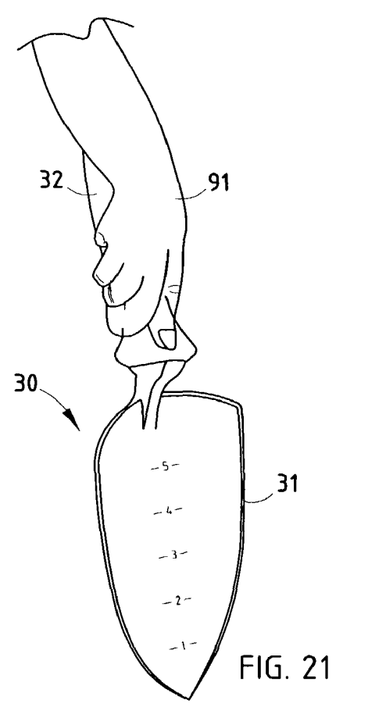

In use, an operator can press on the button cover area 77, which is aligned with the release button 33 to depress the release button and cause the teeth 35 on the release button to disengage from the teeth 36 on the tool head 31. This allows the tool head 31 to be angularly adjusted about pivot pin 64 until the ends of the channel 48 engage mating portions of the release button 33 to limit angular position. As shown in FIGS. 1 and 1B, the illustrated hand tool 30 is angularly adjustable between six different positions, one being a centered position, three being above center at 15° increments, and two being below center at 15° increments. It is contemplated that the different positions may be equal angular spacings or can be different spacings such as at particularly ergonomic positions for specific tasks. For example, note FIG. 20 where the tool head 31 is adjusted to an angle of about 30° relative to the handle 32, in which case, the bones in the user's forearm 90 is generally aligned with the tool head 31 for reducing stress on the user's wrist 91. As shown in FIG. 21, a linear arrangement where the tool head 31 is aligned with the handle may not position the wrist 91 at an acceptably straight position. On the other hand, if the tool 30 is being used to pry, the arrangement in FIG. 21 may be acceptable.

Figure 22:
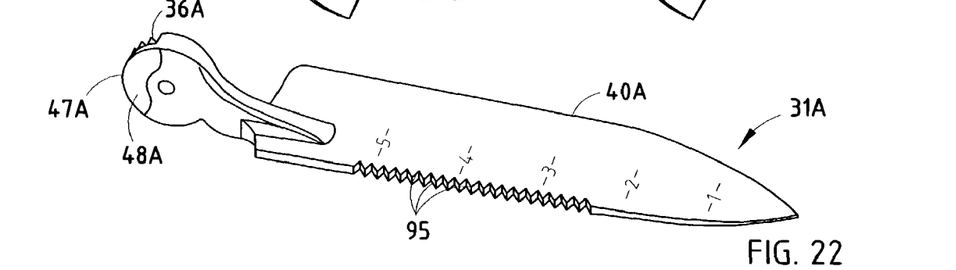
FIGS. 22–24 are perspective, side, and plan views of the second tool head shown in FIG. 2.
Figure 23:
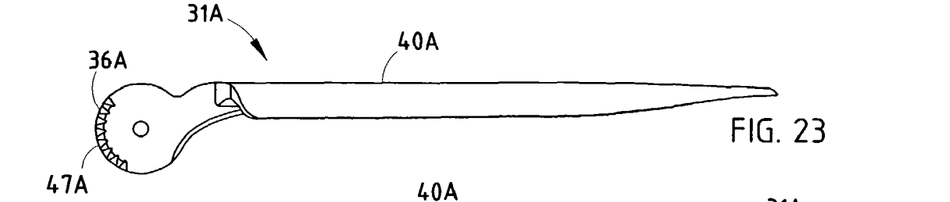
Figure 24:
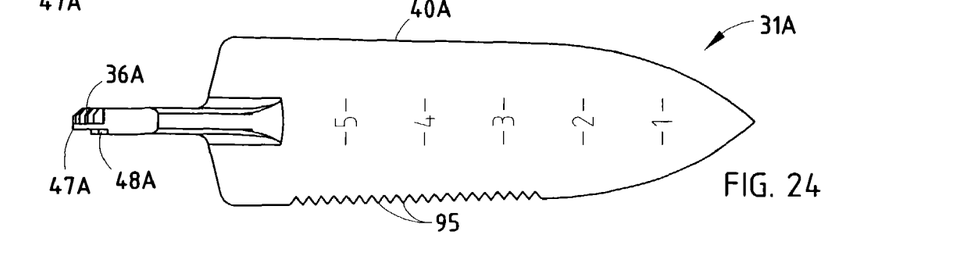
Figure 25:
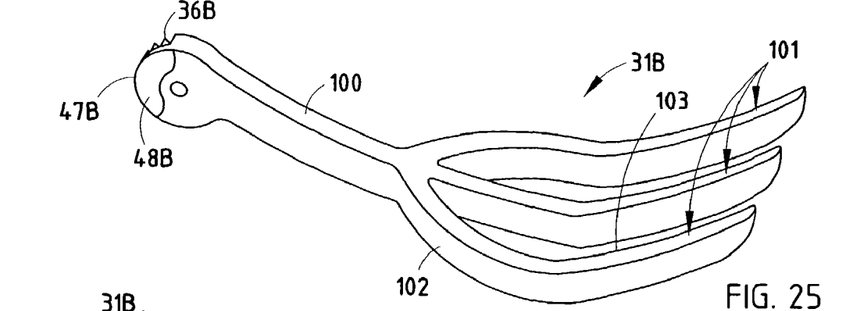
FIGS. 25–27 are perspective, side, and plan views of the third tool head shown in FIG. 2.
Figure 33:
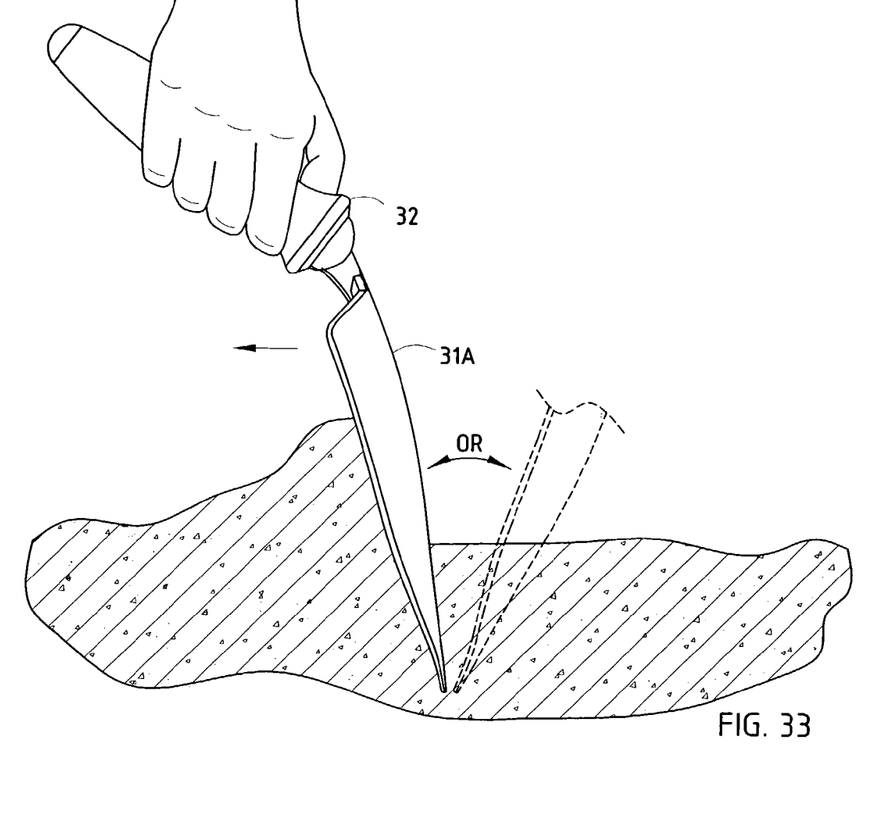

A transplanter/bulb planter tool head 31A (FIGS. 2 and 22–24) is not totally dissimilar to the trowel/V-hoe head 31. However, the transplanter/bulb planter tool head 31B includes a narrower, longer body, and a relatively sharper tip. Further, the tool 31A (FIG. 22) includes a serrated edge 95, which is useful for cutting roots and small branches, or for outlining flower beds. Other optimal shapes of the tool head can be constructed for shoveling and digging in different soils. The illustrated tool head 31A is particularly useful for planting bulbs because of the inch-depth markings, which allow the user to easily see a digging depth (FIG. 33). Also, the angularly-adjustable handle allows for a more natural hand position to be selected.

Figure 26:
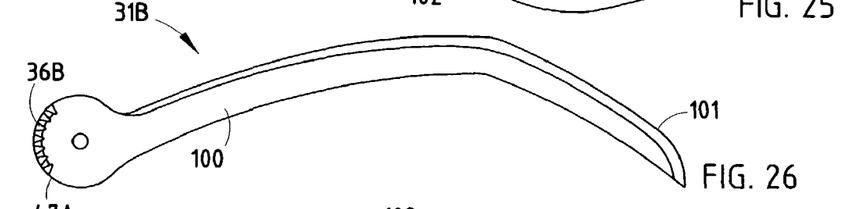
Figure 27:
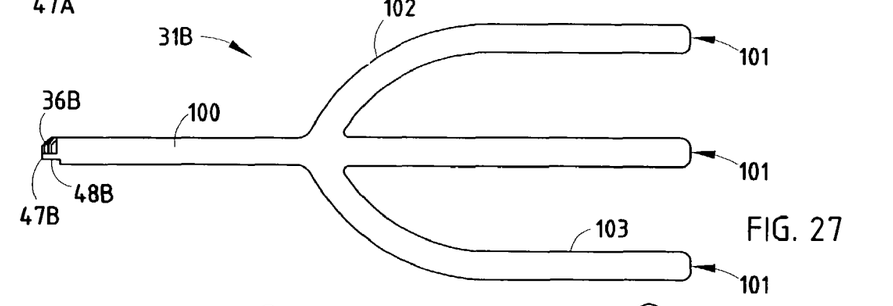
Figure 28:
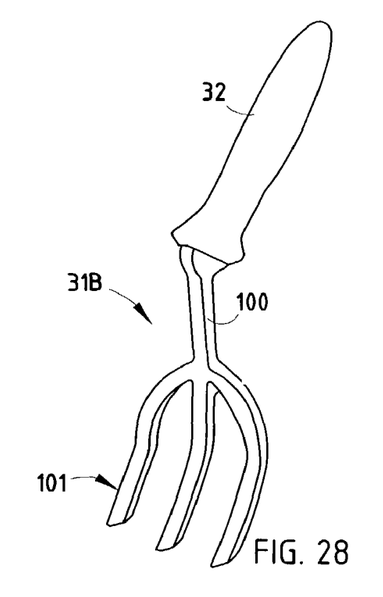
FIGS. 28–29 are perspective views of the hand tool including the third tool head shown in FIG. 25, the tool head in FIG. 28 being adjusted to have tines oriented generally parallel the elongated handle but where they are offset laterally from being aligned with the elongated handle (for jabbing and digging into the ground), and the tool head in FIG. 29 being adjusted to have its tines extend at an angle to the elongated handle but where they are supported generally in line with an end of the elongated handle (for scratching, clawing and cultivating the ground).
Figure 29:
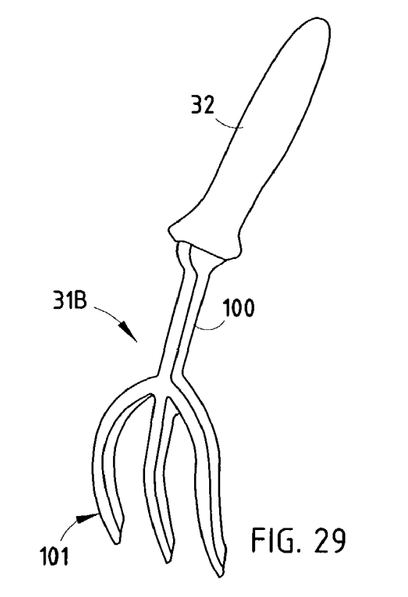
Figure 30:
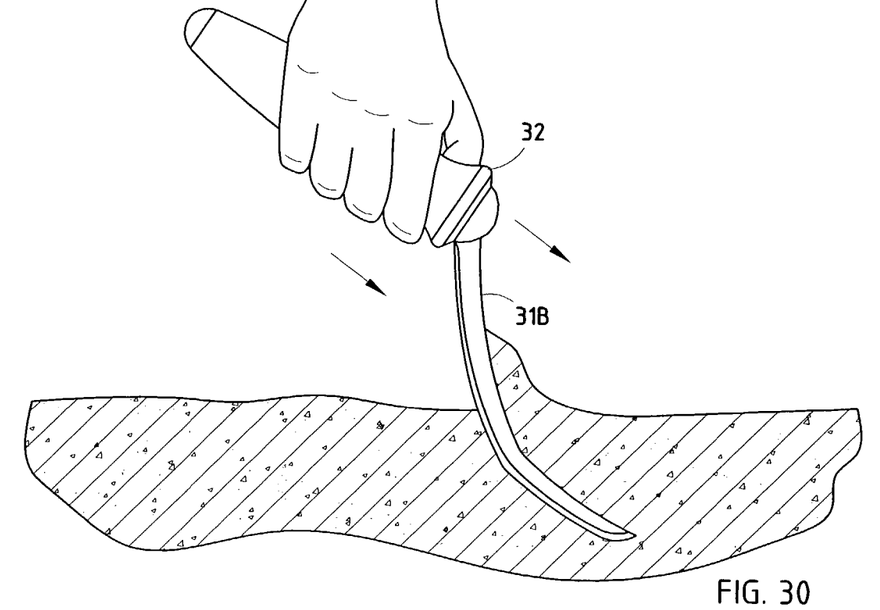
FIGS. 30–31 are side views showing use of the tine in FIG. 28 as a fork (FIG. 30) to dig and as a dragged cultivator (FIG. 31)
Figure 31:
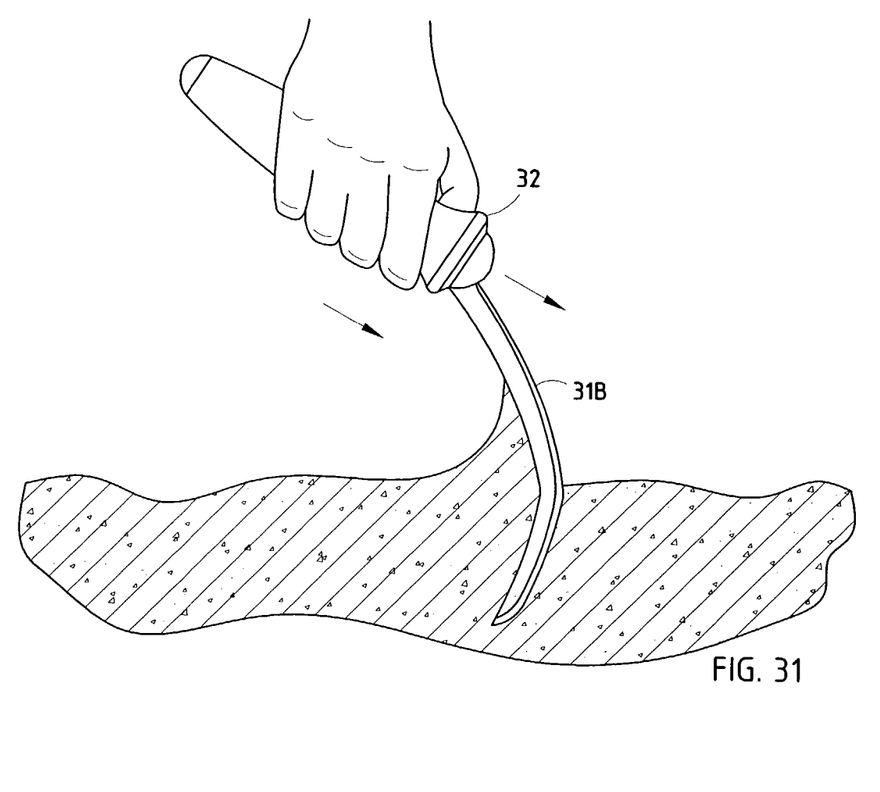
Figure 32:
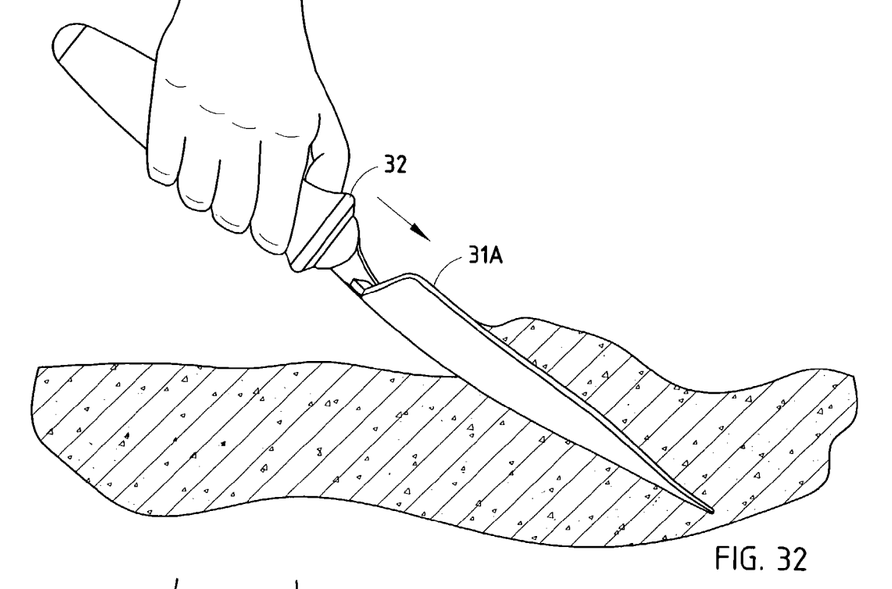
FIGS. 32–33 are side views showing use of the transplanter blade in FIG. 22 as a transplanter tool (FIG. 32), or as a dragged cultivator (FIG. 33, solid lines) or as a bulb planter (FIG. 33, dashed lines).

A cultivator/garden fork tool head 31B (FIGS. 2 and 25–27) includes a stem 100 leading to three tines 101. Each tine 101 includes a root section 102 that extends from the stem 100 in generally a same vertical plane as the stem 100. The outer end 103 of each tine extends at about a 35°–45° angle to the root section 102. (See FIG. 26.) By adjusting the angle of the handle, the tines 101 can be positioned at different angles optimally suited for different uses. In particular, in the adjustment shown in FIGS. 28 and 30, the tine outer ends 103 extend generally parallel the handle internal structure 38 (see lines 106 and 107), but the outer ends 103 of tines 101 are offset from the handle 32B. This creates an optimal ergonomic condition well-suited to allow a user to dig into and lift the soil with minimal stress to the tendons and muscle in a user's wrist and forearm. It is noted that all of the outer ends 103 of tines 101 are located in the same plane, and further they include a pointed tip facilitating the jabbing and digging action. Contrastingly, by adjusting the tines 101 in an opposite direction (FIGS. 29 and 31), the outer ends 103 of tines 101 can be positioned at an angle to the handle internal structure 38. This lets the user ergonomically use the tool to scratch, claw, and cultivate soil.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. An adjustable tool comprising:
a tool head configured for doing at least one particular task;
a handle; and
an internally-positioned adjustment mechanism adjustably connecting the tool head to the handle, the adjustment mechanism being configured to support selective angular adjustment of the tool head relative to the handle between at least two different use positions and to hold the tool head in a selected one of said two different use positions, the adjustment mechanism including overlapping flanges and inter-engaging teeth adapted to releasably hold a selected one of the use positions, and including a cover shielding the teeth from dirt but that leaves exposed a portion of the overlapping flanges so that the tool head can be adjusted without distorting the cover.

2. The adjustable tool defined in claim 1, wherein the handle includes an outer. surface defining a geometric shape, and wherein the internal adjustment mechanism includes a latch member located within the geometric shape.

3. The adjustable tool defined in claim 2, wherein the handle has a transverse cross section that generally defines a circle, and wherein the latch member has a contoured outer surface, the contoured outer surface lying inward from the circle to reduce a likelihood of inadvertent release of the latch member.

4. The adjustable tool defined in claim 2, wherein the cover completely covers the latch member to prevent dirt and debris from entering an area around the latch member.

5. The adjustable tool defined in claim 1, wherein the adjustment mechanism includes first teeth that operably engage mating teeth on one of the tool head and the handle for holding the selected use position.

6. The adjustable tool defined in claim 1, wherein the tool head has a blade section with a narrowed end and shovel shape, for making the tool useful as a trowel.

7. The adjustable tool defined in claim 1, wherein the tool head has a blade section with indicia thereon indicating a depth dimension from an end of the bladed section, for making the tool head useful as a bulb planter and transplanter.

8. The adjustable tool defined in claim 1, wherein the tool head has multiple tines forming a fork.

9. The adjustable tool defined in claim 1, wherein the adjustment mechanism includes a button operably supported on the handle for movement between a released position for permitting adjustment of the tool head on the handle, and a latched position for holding the selected one use position.

10. The adjustable tool defined in claim 9, wherein the handle includes a recess, and the button is positioned in the recess and is actuable while holding the handle.

11. The adjustable tool defined in claim 9, wherein the tool head and handle include overlapping flanges that are pivotally connected, at least one of the flanges including first teeth, and wherein the button includes latching teeth operably engaging the first teeth, when in the latched position, for holding the selected one use position.

12. The adjustable tool defined in claim 1, including a plurality of additional tool heads, each having a particular shape and being configured to do different tasks than the other tool heads.

13. The adjustable tool defined in claim 1, wherein the handle includes a raised area toward the tool head that creates a place to focus hand and finger pressure to resist slippage of the user's hand when the tool head meets resistance.

14. The adjustable tool defined in claim 1, wherein the different use positions include at least three discrete angled positions of the tool head on the handle, and wherein the adjustment mechanism is constructed to select and hold any one of the at least three discrete angled positions.

15. The adjustable tool defined in claim 1, wherein the cover closely engages an outer surface of the overlapping flanges.

16. An adjustable tool comprising:
a tool head configured for doing at least one particular task;
a handle;
an internally-positioned adjustment mechanism adjustably connecting the tool head to the handle, the adjustment mechanism being configured to support selective angular adjustment of the tool head relative to the handle between at least two different use positions and to hold the tool head in a selected one of said two different use positions;
wherein the handle includes an outer surface defining a geometric shape;
wherein the internal adjustment mechanism includes a latch member located within the geometric shape; and
a cover that covers the latch member to prevent dirt and debris from entering an area around the latch member, wherein the cover encloses and covers a majority of the handle.

17. An adjustable tool comprising:
a tool head configured for doing at least one particular task;
a handle; and
an internally-positioned adjustment mechanism adjustably connecting the tool head to the handle, the adjustment mechanism being configured to support selective angular adjustment of the tool head relative to the handle between at least two different use positions and to hold the tool head in a selected one of said two different use positions;
wherein the handle includes an outer surface defining a geometric shape, and wherein the internal adjustment mechanism includes a latch member located within the geometric shape; and
a cover that covers the latch member to prevent dirt and debris from entering an area around the latch member; and
wherein the latch member includes a button that is depressible through the cover and movable between a release position and a latched position.

18. The adjustable tool defined in claim 17, wherein the latch member includes first teeth that operably engage mating teeth on the tool head for holding the selected use position.

19. An adjustable tool comprising:
a tool head configured for doing at least one particular task;
a handle; and
an internally-positioned adjustment mechanism adjustably connecting the tool head to the handle, the adjustment mechanism being configured to support selective angular adjustment of the tool head relative to the handle between at least two different use positions and to hold the tool head in a selected one of said two different use positions; and a cover that encases a majority of the handle including the adjustment mechanism to prevent dirt and debris from entering an area around the adjustment mechanism.

20. An adjustable tool comprising:

a tool head;

a handle adjustably connected to the tool head, the handle including a recess adapted to ergonomically receive and support a user's thumb and fingers so that pressure can be readily communicated through the handle to the tool head while using the tool; and a release button movable between a released position and a latched position for fixing the tool head to the handle in a selected adjusted position, the release button being located near the recess where the release button is easily operated by the user to adjust the tool head, the release button including first teeth with angled outer edges that engage mating teeth with angled surfaces on the tool head, the angled outer edges and angled surfaces reducing a distance of movement of the button in order to engage or disengage the first teeth.

21. The adjustable tool defined in claim 20, wherein the handle is pivotally connected to the tool head.

22. The adjustable tool defined in claim 20, including a spring biasing the button toward the latched position.

23. The adjustable tool defined in claim 20, wherein the button and the tool head include mating teeth defining a plurality of discrete positions of angular adjustment.

24. The adjustable tool defined in claim 20, wherein the recess defines an annular ring, and wherein the button includes an outer surface recessed from a bottom of the annular ring to form a clearance to reduce a likelihood of inadvertent depression of the button.

25. The adjustable tool defined in claim 20, wherein the button is movable along an actuation path, and the angled outer edges define lines that extend at an acute angle to the longitudinal actuation path when viewed in a direction perpendicular to the actuation path.

26. An adjustable tool comprising:

a tool head;

a handle adjustably connected to the tool head, the handle including a recess adapted to ergonomically receive and support a user's thumb and fingers so that pressure can be readily communicated through the handle to the tool head while using the tool;

a release button movable between a released position and a latched position for fixing the tool head to the handle in a selected adjusted position, the release button being located near the recess where the release button is easily operated by the user to adjust the tool head; and including a cover that covers a portion of the handle including an area of the button.

27. An adjustable tool comprising:

a tool head configured for doing at least one particular task;

a handle; and an adjustment mechanism adjustably connecting the tool head to the handle, the adjustment mechanism including overlapping flanges on the tool head and the handle, and a pivot pin connecting the overlapping flanges for selective angular adjustment of the tool head relative to the handle between at least two different use positions; and a cover that closely engages an outer surface of the overlapping flanges to prevent dirt and debris from entering an area around the adjustment mechanism, but that leaves at least a part of one of the overlapping flanges exposed so that the tool head can be angularly adjusted without the tool head distorting the cover and without allowing dirt to enter the adjustment mechanism.

28. The adjustable tool defined in claim 27, wherein the adjustment mechanism includes first teeth that operably engage mating teeth on one of the tool head and the handle for holding the selected use position.

29. An adjustable too comprising:

a head;

a handle connected and adjustable to the head for adjustment around a pivot axis; and a button mounted on the handle adjacent the pivot axis but spaced therefrom and configured to directly release and engage the head allowing adjustment and securing of the head to the handle in at least two different positions; and a cover covering and protecting the button and covering ends of the head and handle at the pivot axis.

30. An adjustable tool comprising:

a head;

a handle connected and adjustable to the head for adjustment around a pivot axis; and a button mounted on the handle adjacent the pivot axis but spaced therefrom and configured to directly release and engage the head allowing adjustment and securing of the head to the handle in at least two different positions; and wherein the button and head include mating teeth that releasably engage, the teeth having angled leading edges that engage at an angle thus reducing required movement of the button for disengagement and that provide a wide area of contact even when only partially engaged.

31. The adjustable tool defined in claim 30, wherein the button is movable along an actuation path that extends parallel the pivot axis, and wherein the teeth define lines that extend at an acute angle to the longitudinal actuation path when viewed in a direction perpendicular to the actuation path.

* * * * *